Figure 1:
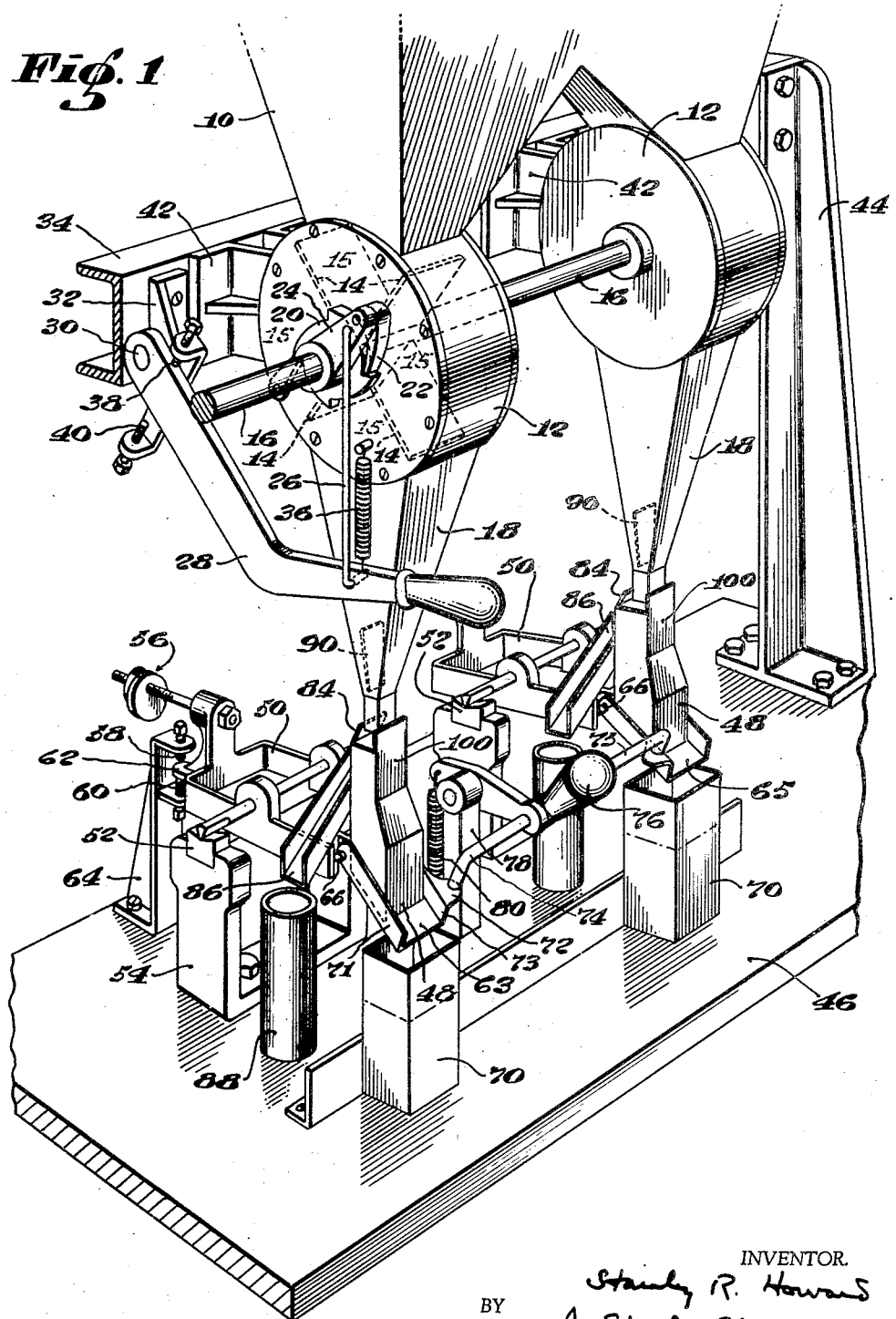

April 17, 1945.　　　S. R. HOWARD　　　2,373,831
WEIGHING MACHINE
Filed April 7, 1942　　　2 Sheets-Sheet 1

INVENTOR.
Stanley R. Howard
BY J. Stanley Churchill
atty

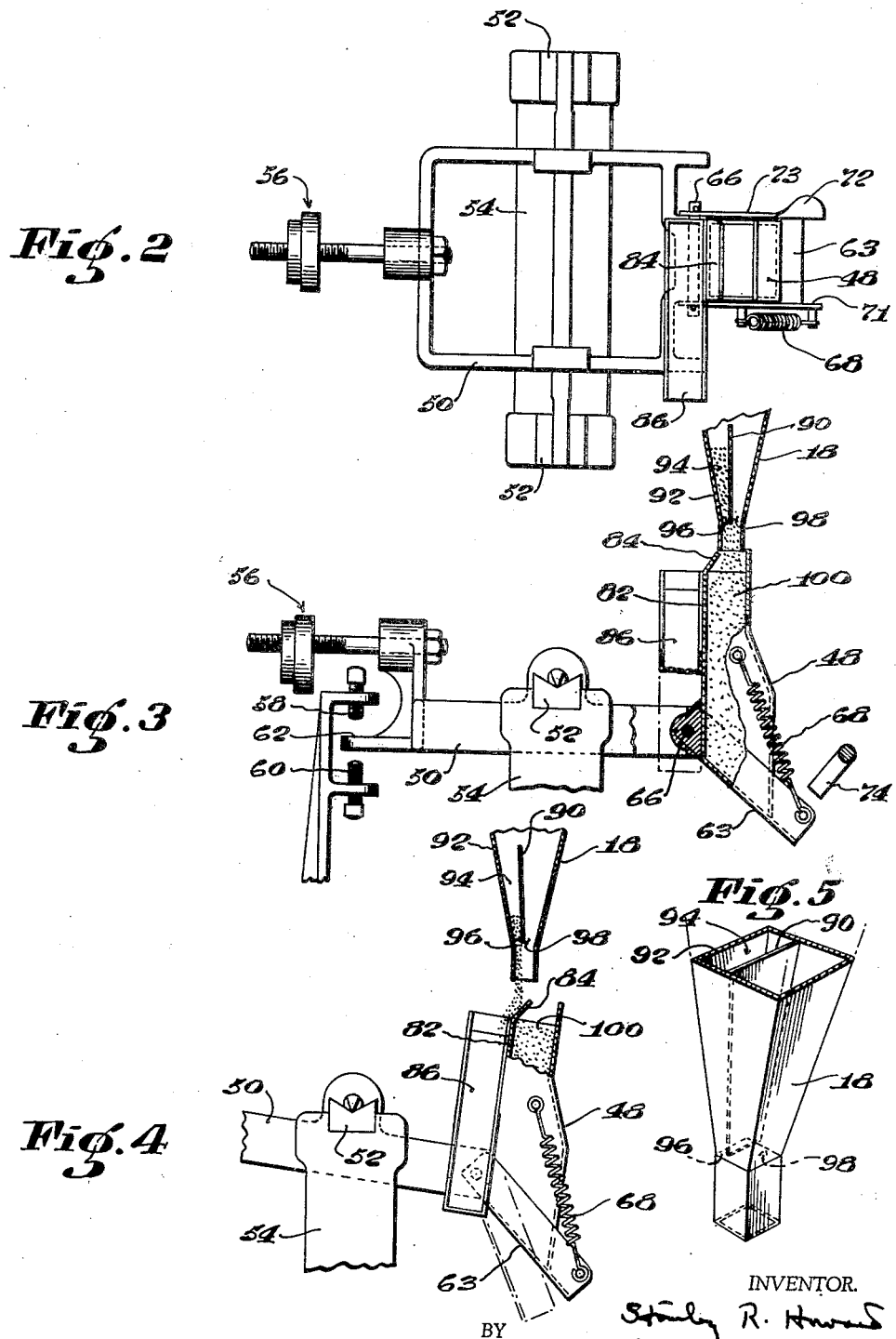

Patented Apr. 17, 1945

2,373,831

UNITED STATES PATENT OFFICE 2,373,831

WEIGHING MACHINE

Stanley R. Howard, Milton, Mass., assignor to Pneumatic Scale Corporation, Limited, Quincy, Mass., a corporation of Massachusetts Application April 7, 1942, Serial No. 437,946

7 Claims. (Cl. 249—6)

This invention relates to a weighing machine.

The invention has for an object to provide a novel and improved construction of weighing machine capable of delivering weighed loads with extreme accuracy.

With this general object in view and such others as may hereinafter appear, the invention consists in the weighing machine and in the various structures, arrangements, and combinations of parts hereinafter described and particularly defined in the claims at the end of this specification.

In the drawings illustrating the preferred embodiment of the invention, Fig. 1 is a perspective view of a weighing machine embodying the present invention; Figs. 2 and 3 are plan and side elevations respectively of the scale beam, Fig. 3 showing the scale beam in operative weighing position and with the scale bucket shown partly in cross section; Fig. 4 is a detail view similar to Fig. 3 showing the scale in its overbalanced position; and Fig. 5 is a detail view in perspective of the discharge end of the material supply funnel to be referred to.

In general, the present invention contemplates a novel weighing machine, particularly adapted for weighing free flowing goods, which is simple in construction and accurate in operation. The illustrated weighing machine comprises a scale beam having a weighing receptacle or bucket rigidly attached to the weighing end thereof, and feeding means arranged to direct a stream of material into the bucket. In the preferred embodiment of the invention, the structure of the bucket is such that upon movement of the scale beam when a predetermined weight is reached, the receiving end of the bucket passes out of range of the stream, the latter being diverted into a separate channel to be returned to the supply. This feature of the invention contributes both to speed and accuracy of the weighing operation in that the material feeding stream is cut off directly by the movement of the scale beam during the weighing operation, thereby eliminating the need for the intermediate mechanisms controlled by the scale beam, either electrically or mechanically operated, which have been heretofore employed for cutting off or terminating the feed of the material from the supply funnel or other feeding member. Thus, the interval of time usually required between the overbalancing or tripping movement of the scale beam and the initiation of such intermediate mechanism for cutting off the stream is saved so that the total weighing time is proportionately decreased. The construction of the weighing receptacle and its relation to the stream is such that the stream is gradually cut off by the receptacle during the weighing operation so that in effect a reduced stream is fed into the receptacle as the final weight is approached thus contributing to the accuracy of the weighing operation.

Another feature of the present invention which is conducive to greater speed and accuracy in the weighing operation resides in the feeding of a quantity of material slightly in excess of the amount required to produce a predetermined desired weight and includes a material feeding funnel operative to permit the bulk of the material to be deposited into the receptacle in a relatively large stream to effect a rapid accumulation of the major portion of the load in the receptacle, and operative to effect a reduced stream for the final portion of the load as the final weight is being approached thus reducing the impact force of the material being fed into the receptacle at this time. The excess material is cut off by the scale beam and diverted into a separate channel as above described.

Still another feature of the invention which is of importance in contributing to the extremely accurate weights obtained with the present weighing machine comprises a weighing receptacle constructed in a manner such as to confine successive loads uniformly in the receptacle so that the center of gravity of each load and consequently the effective overbalancing point is substantially the same for each weighing operation. It will be observed that in the event the bulk of the material deposited in the receptacle is piled up adjacent the outer wall thereof away from the supporting knife edges or rocker bearings of the scale beam, the effective overbalancing force will be greater and will cause the scale to trip earlier than if the load were piled up adjacent the inner wall of the receptacle closer to the scale beam rocker bearings. In order to reduce to a minimum such possible irregularity in the disposition of the material in the receptacle, the upper or receiving end thereof is constructed to provide a relatively small cross-sectional area in which the final portion of the weighed load is confined so that unequal distribution of the material is reduced to a minimum and the center of gravity of successive loads is located in substantially the same position.

Referring now to the drawings, the weighing machine illustrated therein comprises a dual unit mounted in tandem, one unit being a duplicate of the other so that a description of one will suffice for both. As herein shown, the weighing machine is provided with a supply hopper 10 in which a bulk supply of the material to be weighed is stored and from which the material flows by gravity into a measuring hopper or drum 12 provided with a plurality of radially extended vanes 14 separating the drum into compartments 15 of equal size. The vanes 14 are mounted in a central shaft 16 which is arranged to be manually rotated to release the contents of a compartment into a guide chute or funnel 18. The mechanism for rotating the shaft 16 includes a ratchet 20 mounted fast on the shaft, and a pawl 22 arranged to cooperate with the ratchet teeth. The pawl 22 is carried by a lever 24 which is connected by a link 26 to an operating arm 28 pivotally mounted at 30 in a bracket 32 attached to a tie piece 34 forming part of the machine frame. The operating arm 28 is normally urged into its upraised position by a spring 36 and is limited in its movement in this direction by a stop screw 38 carried by the bracket 32. A second stop screw 40 limits the movement of the arm in the opposite direction, each stop screw being adjustable to regulate the movement of the pawl 22 with relation to its ratchet 20. As illustrated in Fig. 1, each feeding unit is supported on a bracket 42 attached to the tie piece 34, the latter being supported by standards 44, only one of which is shown, mounted on the platen 46 of the machine.

As herein shown, the material released from a compartment 15 into the funnel 18, upon operation of the arm 28, is permitted to flow into a scale bucket 48 carried on the weighing end of a scale beam 50. The scale beam 50 is supported upon the usual knife edge bearings 52 carried by a bracket 54 attached to the platen 46. The other end of the scale beam 50 carries the usual adjustable counterweights 56. A pair of adjustable set screws 58, 60 are provided which are engageable with an extended portion 62 of the scale beam to limit the rocking movement of the scale beam. The set screws 58, 60 are adjustably mounted in a bracket 64 fastened to the platen 46 of the machine.

As best shown in Figs. 3 and 4, the scale bucket 48 is closed at its lower or discharge end by a hinged gate 63 pivotally mounted on a pin 66 carried in the end of the scale beam. The gate 63 is normally retained in closed relationship with the sloped bottom of the bucket by a spring 68, and, as herein shown, provision is made for rocking the gate to release the material in the bucket and to permit the material to flow into a container 70 positioned therebeneath. The gate 63 is made in the form of a chute having upstanding side edges 71, 73 and an extension 72 from one side edge is arranged to be engaged by an arm 74 secured in a hand lever 76 rockingly mounted in a bracket 78 attached to the machine frame. A spring 80 operates to urge the hand lever 76 into an inoperative position, and upon manual rocking of the lever the gate 63 is pivoted to release the weighed material. A similar arm 75 extending from the opposite side of the lever 76 is arranged to engage the gate 65 of the second scale so that both loads are dumped simultaneously. It will be observed that when pressure is brought to bear against the gates, the counterweight end of the scale beam engages the stop screw 58 to limit the movement of the beam during the dumping operation.

From the description thus far it will be observed that in the operation of the machine when the arm 28 is rocked downwardly a load of material is released into the feeding funnel 18 which guides the material in a stream directly into the weighing receptacle 48, the latter being preferably rigidly attached to the scale beam 50. Each compartment 15 is designed to contain a greater volume of material than is necessary to obtain the desired predetermined weight so that in operation the stream continues to flow after the predetermined weight is reached, the excess material fed being diverted from the receptacle into a separate channel when the scale is overbalanced. Referring now to Figs. 3 and 4, it will be observed that the rear wall 82 of the scale bucket 48 is provided with an upwardly and angularly extended portion 84 arranged to intercept the stream upon rocking of the scale beam when the predetermined weight is reached and to divert the flow thereof into a chute 86 mounted on the back of the receptacle, as shown. The stream thus diverted is arranged to be received by a separate container 88 which may be emptied periodically into the supply hopper 10.

Provision is made in the preferred embodiment of the invention for controlling the stream being fed through the funnel 18, and, as herein shown, the lower end of the funnel is provided with a partition member 90 which, together with the side walls and the angularly disposed rear wall 92 of the funnel, forms a pocket 94 having a restricted outlet 96. In operation, as best shown in Figs. 3 and 4, the bulk or major portion of the material released into the funnel 18 passes through the relatively larger outlet 98 of the funnel so that the greater part of the load may be rapidly accumulated in the receptacle. In practice, the measured load released from the drum 12 may be approximately one ounce more than the required weight so that when the major portion of the measured load has been introduced into the receptacle a relatively smaller portion of material is retained in the pocket 94. This material continues to flow through the restricted outlet 96 in a relatively fine drip stream. When the predetermined weight is reached and the scale overbalances the stream is cut off by the stream intercepting member 84 as above described. The pocket 94 is of such a size as to retain sufficient material to insure the feeding of the drip stream until the scale reaches its weight. Thus, it will be seen that while the major portion of the load may be deposited rapidly to increase the speed of the weighing operation, accuracy is obtained by feeding the last portion of the stream at a reduced rate so as to reduce to a minimum the impact force on the scale as the final weight is approached. It will also be observed that as the scale starts to overbalance the intercepting member 84 will at first be gradually moved into the path of the reduced stream thus reducing the flow into the receptacle still further until the predetermined weight is reached whereupon the stream is completely cut off and diverted as above described. In the operation of the machine, when the desired weight is reached, the gates 63, 65 are opened, as above described, to release the weighed loads into the cartons 70 whereupon the scale beams 50 return to their weighing position by virtue of the counterweights 56 and thereafter a succeeding measured load is released from a compartment 15 by operation of the arm 28. In the illustrated embodiment of the invention, it will be observed that when the scale beam returns to its weighing position an extended portion 100 of the front wall of the receptacle 48 engages the front wall of the discharge end of the funnel 18 to serve as a limiting stop for the scale in its weighing position as shown in Fig. 3.

Provision is also made in the illustrated embodiment of the invention for reducing to a minimum the effect of unequal distribution of successive weighed loads in the receptacle so that overbalancing of the scale will occur at the same relative time whereby to obtain maximum uniformity in successive weighed loads. As herein shown, see Fig. 3, in order to confine successive loads uniformly in the receptacle, the upper end 100 of the latter is constructed to provide a relatively small cross-sectional area arranged to receive and confine the final portion of the weighed load at a predetermined position with respect to the scale beam so that unequal distribution of the material in the upper portion of the receptacle is reduced to a minimum. In this manner the center of gravity of successive loads deposited into the rigidly mounted receptacle is disposed in substantially the same position so as to effect overbalancing of the scale beam by the depositing of the load at the same point upon the scale beam in each of succeeding weighing operations thus assuring uniform accuracy in succeeding weighed loads.

While the preferred embodiment of the invention has been herein illustrated and described it will be understood that the invention may be embodied in other forms within the scope of the following claims.

Having thus described the invention, what is claimed is:

1. In a weighing machine, in combination, weighing means including a scale beam, a weighing receptacle fixedly mounted thereon, material feeding means including a funnel arranged to feed material in a vertical stream into said receptacle, material supply means arranged to supply a measured quantity of material to said funnel in an amount slightly in excess of the amount required to form a predetermined weight in said receptacle, a partition member in said funnel forming with one wall thereof a pocket having a restricted discharge opening and arranged to retain a quantity of said measured load and to discharge it in a relatively fine stream after the bulk of the material has been delivered to said receptacle, and a diverting member formed integrally with said receptacle arranged to intercept said stream and to divert the excess material from the receptacle upon overbalancing of the scale beam when the predetermined weight is reached.

2. In a weighing machine, in combination, weighing means including a scale beam, a weighing receptacle fixedly mounted upon the scale beam, material feeding means arranged to feed material in a vertical stream into said receptacle, and means formed integrally with said weighing receptacle for diverting the flow of said stream upon rocking of the scale beam when the predetermined weight is reached, said diverting means comprising an inclined member extending from a substantially vertical wall of the receptacle arranged to tilt to gradually cut off and decrease the flow of material into the receptacle as the scale beam approaches its weight whereby to produce a gradually decreasing stream.

3. In a weighing machine, in combination, weighing means including a scale beam, a weighing receptacle fixedly attached to said scale beam, material feeding means arranged to feed material in a vertical stream into said receptacle, and a diverting member formed integrally with said receptacle arranged to intercept said stream and to divert it from the receptacle upon overbalancing of the scale beam when the predetermined weight is reached, said diverting member comprising an inclined portion extending from a substantially vertical wall of the receptacle arranged to tilt to gradually cut off and decrease the flow of material into the receptacle as the scale beam approaches its weight whereby to produce a gradually decreasing stream.

4. In a weighing machine, in combination, weighing means including a scale beam, a weighing receptacle fixedly mounted thereon, material feeding means including a funnel arranged to feed material in a vertical stream into said receptacle, material supply means arranged to supply a measured quantity of material to said funnel in an amount slightly in excess of the amount required to form a predetermined weight in said receptacle, and a partition member in said funnel forming with one wall thereof a pocket having a restricted discharge opening and arranged to retain a quantity of said measured load and to discharge it in a relatively fine stream after the bulk of the material has been delivered to said receptacle, and a diverting member formed integrally with said receptacle arranged to intercept said stream and to divert the excess material from the receptacle upon overbalancing of the scale beam when the predetermined weight is reached, said diverting member comprising an inclined portion extending from a substantially vertical wall of the receptacle arranged to tilt to gradually cut off and decrease the flow of material into the receptacle as the scale beam approaches its weight whereby to produce a gradually decreasing stream.

5. In a weighing machine, in combination, weighing means including a scale beam mounted on rocker bearings, a weighing receptacle fixedly attached to said scale beam, material feeding means arranged to feed material in a vertical stream directed into said receptacle, and means formed integrally with said weighing receptacle for diverting the flow of said stream upon rocking of the scale beam when a predetermined weight is reached, said diverting means comprising an inclined member extending from a substantially vertical wall of the receptacle arranged to tilt to gradually cut off and decrease the flow of material into the receptacle as the scale beam approaches its weight whereby to produce a gradually decreasing stream, the walls of said receptacle being formed to provide a reduced cross sectional area at its upper end to confine successive loads of material substantially uniformly in the receptacle whereby the center of gravity of each weighed load is disposed in substantially the same position with relation to said rocker bearings to reduce to a minimum variations due to the shifting of the center of gravity of successive charges.

6. In a weighing machine, in combination, weighing means including a scale beam mounted on rocker bearings, a weighing receptacle fixedly mounted on said scale beam, material feeding means including a funnel arranged to feed material in a vertical stream into said receptacle, a partition member forming with one wall of said funnel a pocket having a restricted discharge opening for reducing the size of said stream at the final portion of the weighing period, and means formed integrally with said weighing receptacle for diverting the flow of said stream upon rocking of the scale beam when a predetermined weight is reached, said diverting means comprising an inclined member extending from a substantially vertical wall of the receptacle arranged to tilt to gradually cut off and decrease the flow of material into the receptacle as the scale beam approaches its weight whereby to produce a gradually decreasing stream, the walls of said receptacle being formed to provide a reduced cross sectional area at its upper end to confine successive loads of material substantially uniformly in the receptacle whereby the center of gravity of each weighed load is disposed in substantially the same position with relation to said rocker bearings to reduce to a minimum variations due to shifting of the center of gravity of successive charges.

7. In a weighing machine, in combination, weighing means including a scale beam, a weighing receptacle fixedly attached to said scale beam, material feeding means arranged to feed material in a vertical stream into said receptacle, and a diverting member comprising an inclined member extending from a substantially vertical wall of said receptacle and arranged to intercept said stream and to divert it from the receptacle upon overbalancing of the scale beam when the predetermined weight is reached.

STANLEY R. HOWARD.